H. SLATER.
POULTRY TROUGH OR FEEDER.
APPLICATION FILED AUG. 4, 1914.
1,172,913.
Patented Feb. 22, 1916.
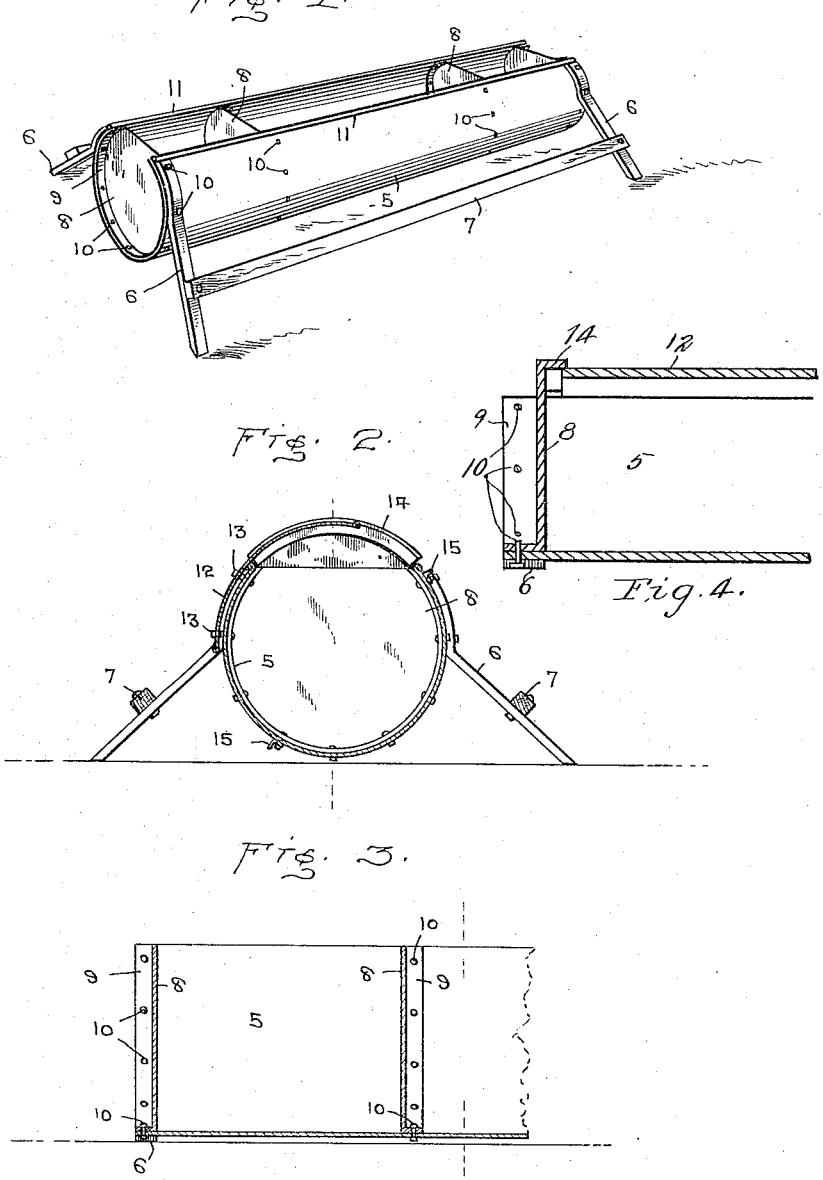

UNITED STATES PATENT OFFICE.

HARRY SLATER, OF INDIANA, PENNSYLVANIA.

POULTRY TROUGH OR FEEDER.

1,172,913.   Specification of Letters Patent.   Patented Feb. 22, 1916.

Application filed August 4, 1914. Serial No. 854,956.

*To all whom it may concern:*

Be it known that I, HARRY SLATER, a citizen of the United States, residing at Indiana, in the county of Indiana and State of Pennsylvania, have invented certain new and useful Improvements in Poultry Troughs or Feeders; and I do hereby declare the following to be a full, clear, and exact description of the invention, such as will enable others skilled in the art to which it appertains to make and use the same.

This invention relates to poultry troughs or feeders and has particular reference to that type of such devices as are readily portable from place to place.

As a principal object this invention contemplates the provision of a poultry trough or feeder with which it will be impossible for the fowls to waste any of the grain or other food therein contained.

Another object is to provide a poultry trough or feeder which is adapted to contain permanently various food materials which will be rendered quite inaccessible to rats or mice.

A further object is the provision of a feeder which may be kept perfectly sanitary at a very small expenditure of time or labor.

A still further object accomplished by this invention is the provision of means by which the portion of the feeder accessible to the fowls may be quickly and easily regulated.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which like characters of reference designate similar parts, Figure 1 is a perspective view of one of the forms of my poultry feeder, Fig. 2 is a transverse sectional view of a second form of my feeder, and, Fig. 3 is a longitudinal section through the make disclosed in Fig. 1. Fig. 4 is a longitudinal section through the make disclosed in Fig. 2.

Proceeding now to the description of the drawings and having particular reference to Fig. 1 in which the form embodying the basic principle of my invention is disclosed, it will be seen that the main or body portion of my invention consists of the substantially cylindrical member 5, the upper portion of which is however, cut away along a horizontal plane. This body 5 is supported in a position just clearing the surface of the ground by the legs 6 of which there are four, a pair being positioned at opposite ends of the body 5 as clearly shown in the drawings. The upper ends of these legs 6 are curved to conform to a portion of the body 5 and are then bent outwardly to form a suitable support. Longitudinal braces 7 are provided adjacent the ground engaging portion of the legs 6 to securely hold the same. In this connection it will be noted that this cylindrical body 5 and the legs 6 are preferably formed of light sheet steel slightly greater in thickness than ordinary stove pipe iron thus making a firm and durable structure. The braces 7 however, may be of wood or any desired material.

The interior of the cylindrical body 5 is separated or subdivided into a plurality of compartments by means of the transverse partitions 8. These partitions as will be seen on reference to Fig. 1 are formed with annular flanges 9 by means of which they are secured to the body 5 by the bolts 10. These same bolts 10 may also be used to hold the curved portions of the legs 6 thus dispensing with additional fastening means for securing the legs to the body 5. The top edges of the body 5 are preferably turned or rolled in order to prevent sharp corners which might be liable to injure the fowl feeding from my trough.

From the foregoing description it will be seen that I have provided a poultry feeder or trough capable of attaining the foregoing objects. Being formed as it is of sheet steel and preventing by its rounded surfaces any corners whatever, it is extremely easy to keep clean and entirely sanitary and may readily be scalded and washed to prevent the gathering of vermin. An equally important point also accomplished is the absolute prevention of waste of the grain or other food used in the trough. As is known to all keepers of poultry, fowls have a way of sorting out corn or wheat from the oats when such grain is being fed them by drawing a quantity of the grain up the sides of the trough with their beak to the top, eating the particular grains they consider choice and wasting the rest by scattering it on the ground. This operation is rendered impossible of accomplishment in a trough constructed as herein disclosed owing to the curvature of the sides 5. In the various compartments formed by the transverse partitions 8 may be placed different varieties of food material such as grain mash and pounded shells, the instinct of the fowls being to feed upon the proper quantity only of the food best suited for them despite the very general but totally unfounded theory to the contrary.

Turning now to the modification shown in Fig. 2, it will be noted that this form is similar to that shown and described in Figs. 1 and 3 with the addition of a sliding semicircular door thereto. This door 12 is adapted to slide between suitable Z-shaped guides 13 and the body portion 5 and is made conformable to the form of the latter. The end partitions 8 are modified in this form in that they are entirely circular and have formed therewith the semi-annular flanges 14 in order to bridge the gap at the ends of the cylindrical body 5, due to the shortening of the sliding cover 12 to permit it to pass between the pairs of legs 6. Suitable stop lugs 15 are placed as shown to limit the movement of the door. This form of my invention embodies all the advantages previously enumerated for the first mentioned form and in addition has the desirable point of permitting complete closure of the trough at night or other times so as to exclude rats or mice and to render the food contained in the trough safe from their depredations. An additional point is that the door may be partly opened as shown in Fig. 2 in order to regulate the amount of space through which the food material may be obtained by the fowls. When so used the poultry will be enabled to feed but from one side of the trough while when the door is completely opened and resting against the lower stop lug 15 they may feed from both sides thereof, the latter also being possible in the first mentioned form of my invention.

A further advantage made possible by the above described construction is the possibility of alining two or more of my metal troughs longitudinally in such manner as to form one continuous trough subdivided into compartments each of the units of the continuous trough being similar to the structure above described thus making my invention adaptable for use by the large breeder or keeper of poultry as well as the small.

While in the foregoing I have thus illustrated in the drawings and described in the specification such combination and arrangement of elements as constitute the preferred embodiment of my invention I desire to emphasize the fact that I may make such minor changes in the matters of proportion and degree, in later adaptations of my device as shall not alter the spirit of my invention as defined in the appended claim.

What I claim is:

In a feeding device, the combination with a cylindrical body having an opening therein, extending the full length of said body, and supporting legs at either end of the body, of a plurality of circular partitions in said body, the end partitions having outwardly extending flanges on the portion inclosed within the walls of the body portion adapting the same to be fastened to said body portion, and inwardly extending flanges on the portion above the level of the opening in said body portion, a semi-cylindrical door, said door or cover being of less length than said body portion to admit of its passage between said legs, the ends of said door being overlapped by the inwardly extending flanges of said end partitions to provide a substantially tight closure throughout the length of the trough, stops to limit the movement of said door in either direction, and means to guide said sliding door.

In testimony whereof I have signed my name to this specification in the presence of two subscribing witnesses.

HARRY SLATER.

Witnesses:
EDWIN K. WOOD,
WM. M. LIGGETT.

Copies of this patent may be obtained for five cents each, by addressing the "Commissioner of Patents, Washington, D. C."